United States Patent
Abadi et al.

(10) Patent No.: US 10,372,194 B2
(45) Date of Patent: Aug. 6, 2019

(54) OPTIMIZING USE OF LOCATION SERVICES IN MOBILE APPLICATIONS TO IMPROVE BATTERY CONSUMPTION

(71) Applicant: International Business Machines Corporation, Armink, NY (US)

(72) Inventors: Aharon Abadi, Petach Tikva (IL); Moria Abadi, Petach Tikva (IL); Mordechai Nisenson, Kiryat Tivon (IL)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 15/018,880

(22) Filed: Feb. 9, 2016

(65) Prior Publication Data
US 2017/0228011 A1   Aug. 10, 2017

(51) Int. Cl.
*G06F 9/44* (2018.01)
*G06F 1/3234* (2019.01)
*G06F 9/30* (2018.01)
*G06F 8/33* (2018.01)
*G06F 8/41* (2018.01)
(Continued)

(52) U.S. Cl.
CPC ............ *G06F 1/3234* (2013.01); *G06F 1/325* (2013.01); *G06F 1/3215* (2013.01); *G06F 3/0484* (2013.01); *G06F 8/33* (2013.01); *G06F 8/433* (2013.01); *G06F 8/52* (2013.01); *G06F 9/30145* (2013.01); *G06F 11/3664* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 7,224,979 B2* | 5/2007 | Singhal | ................... | H04W 4/04 370/338 |
| 7,627,425 B2* | 12/2009 | Salmre | ..................... | G06F 8/35 701/426 |

(Continued)

FOREIGN PATENT DOCUMENTS

| | | |
|---|---|---|
| AU | 2012275665 | 1/2013 |
| IN | 3034/CHE/2008 | 7/2011 |
| WO | 2013152349 | 10/2013 |

OTHER PUBLICATIONS

Alam,Faisal, et al. "Energy optimization in Android applications through wakelock placement." Proceedings of the conference on Design, Automation & Test in Europe. European Design (Year: 2014).*

(Continued)

*Primary Examiner* — Matthew J Brophy
(74) *Attorney, Agent, or Firm* — G. E Ehrlich

(57) ABSTRACT

A method for optimizing use of location services in mobile applications, comprising: analyzing a computer code executable on a processor of a mobile device; identifying in the computer code program instructions for receiving location data from at least one location service device of the mobile device; analyzing the program instructions according to a set of location request rules to identify program instructions violating at least one of the location request rules; and providing at least one suggested change to the program instructions according to the at least one of the location request rules.

20 Claims, 2 Drawing Sheets

(51) Int. Cl.
*H04W 4/02* (2018.01)
*G06F 3/0484* (2013.01)
*G06F 11/36* (2006.01)
*G06F 8/52* (2018.01)
*G06F 1/3215* (2019.01)

(56) References Cited

U.S. PATENT DOCUMENTS

| | | | | |
|---|---|---|---|---|
| 8,036,679 | B1* | 10/2011 | Barbeau | H04W 4/02 |
| | | | | 455/456.1 |
| 8,239,840 | B1* | 8/2012 | Czymontek | G06F 8/34 |
| | | | | 717/125 |
| 8,310,394 | B2* | 11/2012 | Kim | H04M 1/72572 |
| | | | | 342/357.31 |
| 8,489,111 | B2* | 7/2013 | Chawla | H04W 52/0254 |
| | | | | 455/456.1 |
| 8,948,781 | B2* | 2/2015 | Wang | G01S 19/34 |
| | | | | 455/456.1 |
| 9,176,843 | B1* | 11/2015 | Ismael | G06F 11/362 |
| 9,262,157 | B2* | 2/2016 | Henriksen | G06F 8/77 |
| 9,501,382 | B2* | 11/2016 | Hu | G06F 11/3604 |
| 9,792,432 | B2* | 10/2017 | Bilogrevic | G06F 21/54 |
| 2002/0173317 | A1* | 11/2002 | Nykanen | H04W 4/02 |
| | | | | 455/456.1 |
| 2003/0158609 | A1* | 8/2003 | Chiu | G06F 1/3203 |
| | | | | 700/22 |
| 2006/0116817 | A1* | 6/2006 | Salmre | G06F 8/35 |
| | | | | 701/426 |
| 2008/0282229 | A1* | 11/2008 | Kim | G06F 9/454 |
| | | | | 717/124 |
| 2009/0312032 | A1* | 12/2009 | Bornstein | G01S 19/48 |
| | | | | 455/456.1 |
| 2011/0250875 | A1* | 10/2011 | Huang | H04W 4/02 |
| | | | | 455/418 |
| 2012/0065802 | A1* | 3/2012 | Seeber | G06F 1/3203 |
| | | | | 700/295 |
| 2012/0233595 | A1* | 9/2012 | Ghanathe | G06F 8/10 |
| | | | | 717/123 |
| 2013/0337789 | A1* | 12/2013 | Johnson | H04W 4/02 |
| | | | | 455/414.1 |
| 2014/0111027 | A1* | 4/2014 | Rezaei | G08G 1/00 |
| | | | | 307/116 |
| 2014/0137264 | A1* | 5/2014 | Bilogrevic | G06F 21/54 |
| | | | | 726/27 |
| 2014/0316841 | A1* | 10/2014 | Kilby | G06Q 10/06316 |
| | | | | 705/7.26 |
| 2014/0323146 | A1* | 10/2014 | Stenfelt | H04L 41/0893 |
| | | | | 455/456.1 |
| 2014/0380283 | A1* | 12/2014 | Hu | G06F 11/3604 |
| | | | | 717/132 |
| 2015/0261656 | A1* | 9/2015 | Guha | G06F 11/3664 |
| | | | | 717/135 |
| 2015/0309790 | A1* | 10/2015 | Henriksen | G06F 8/77 |
| | | | | 717/121 |
| 2017/0123963 | A1* | 5/2017 | Koren | G06F 11/3688 |

OTHER PUBLICATIONS

Banerjee, Abhijeet, et al. "Detecting energy bugs and hotspots in mobile apps." Proceedings of the 22nd ACM SIGSOFT (Year: 2014).*

Pathak, Abhinav, et al. "What is keeping my phone awake?: characterizing and detecting no-sleep energy bugs in smartphone apps." Proceedings of the 10th international conference on Mobile systems, applications, and services. ACM, 2012. (Year: 2012).*

Alshammeri, Menwa Hayef K. Maue: A Framework for Detecting Energy Bugs From User Interactions On Mobile Applications. Diss. University of Colorado Colorado Springs. Kraemer Family Library, 2015. (Year: 2015).*

Zhuang, Zhenyun, Kyu-Han Kim, and Jatinder Pal Singh. "Improving energy efficiency oflocation sensing on smartphones." Proceedings (Year: 2010).*

Lee, Seokjun, et al. "EnTrack: a system facility for analyzing energy consumption of Android system services." Proceedings of the 2015 ACM International Joint Conference on Pervasive and Ubiquitous (Year: 2015).*

Banerjee, Abhijeet, and Abhik Roychoudhury. "Automated re-factoring of android apps to enhance energy-efficiency." Mobile Software Engineering and Systems (MOBILESoft), 2016 IEEE/ACM International (Year: 2016).*

Morla, Ricardo, and Nigel Davies. "Evaluating a location-based application: A hybrid test and simulation environment." IEEE Pervasive computing 3.3 (2004): 48-56. (Year: 2004).*

Zhenyun Zhuang et al., "Improving energy efficiency of location sensing on smartphones", Proceeding MobiSys '10 Proceedings of the 8th international conference on Mobile systems, applications, and services pp. 315-330, 2010.

Jonathan Feist., "Android customization—save battery by managing Location services (without root)", Can be found at: http://www.androidauthority.com/tasker-location-services-532624/, 2014.

\* cited by examiner

OPTIMIZING USE OF LOCATION SERVICES IN MOBILE APPLICATIONS TO IMPROVE BATTERY CONSUMPTION

BACKGROUND

The present invention, in some embodiments thereof, relates to improving battery consumption in a mobile device and, more specifically, but not exclusively, to improving battery consumption by optimizing use of location services of the mobile device by applications.

Location services are becoming a big part of what smartphones do for us and as a result they gather a lot of information about where we are. Location-based applications have become increasingly popular on smartphones over the past years. The active use of these applications can however cause device battery drain owing to their power-intensive location-sensing operations. Location services are one of the main reasons for battery drain. Wise strategy of using location services may prolong battery life significantly.

SUMMARY

According to an aspect of some embodiments of the present invention there is provided a method for optimizing use of location services in mobile applications, comprising: analyzing a computer code executable on a processor of a mobile device; identifying in the computer code program instructions for receiving location data from at least one location service device of the mobile device; analyzing the program instructions according to a set of location request rules to identify program instructions violating at least one of the location request rules; and providing at least one suggested change to the program instructions according to the at least one of the location request rules.

Optionally, the computer code is edited by a graphical user interface (GUI) of an integrated development environment (IDE) executed on a client terminal.

More optionally, the at least one suggested change is presented in the GUI.

Optionally, the computer code is included in a software development kit (SDK) for mobile applications.

Optionally, the computer code is included in a mobile application currently installed on the mobile device.

Optionally, the at least one location service device includes global positioning system (GPS).

Optionally, the at least one location service device includes network location service.

Optionally, the method further comprises: automatically changing the computer code according to the at least one suggested change.

Optionally, the identifying includes representing the computer code as a finite state machine (FSM).

Optionally, the identifying includes representing at least parts of the computer code with intermediate representation (IR).

More optionally, the intermediate representation (IR) is one of abstract syntax tree (AST), control flow graph (CFG), static single assignment form (SSA) and program dependence graph (PDG).

Optionally, the analyzing of the program instructions includes at least one of dynamic profiler, symbolic execution and control flow analysis.

Optionally, the set of location request rules includes a rule for requesting location in proximity to a use of the location in the computer code.

Optionally, the set of location request rules includes a rule for using network location service instead of GPS location service when possible.

Optionally, the set of location request rules includes a rule for using existing location information instead of requesting location updates received from the at least one location service device.

Optionally, the set of location request rules includes a rule for maximal frequency of location updates received from the at least one location service device.

Optionally, the suggested change includes adding a command to stop requesting location.

According to some embodiments of the invention there is provided a computer readable medium comprising computer executable instructions adapted to perform the method.

According to an aspect of some embodiments of the present invention there is provided a system for optimizing use of location services in mobile applications, comprising: a memory storing a set of location request rules; a code store storing a code of an application; and at least one processor coupled to the imager, the memory and the program store for executing the stored code, the code comprising: code instructions to analyze a computer code executable on a processor of a mobile device; code instructions to identify in the computer code program instructions for receiving location data from at least one location service device of the mobile device; code instructions to analyze the program instructions according to the set of location request rules to identify program instructions violating at least one of the location request rules; and code instructions to provide at least one suggested change to the program instructions according to the at least one of the location request rules.

According to an aspect of some embodiments of the present invention there is provided a software program product for optimizing use of location services in mobile applications, comprising: a non-transitory computer readable storage medium; first program instructions for analyzing a computer code executable on a processor of a mobile device; second program instructions for identifying in the computer code program instructions for receiving location data from at least one location service device of the mobile device; third program instructions for analyzing the program instructions according to a set of location request rules to identify program instructions violating at least one of the location request rules; and fourth program instructions for providing at least one suggested change to the program instructions according to the at least one of the location request rules; wherein the first, second, third and fourth program instructions are executed by at least one computerized processor from the non-transitory computer readable storage medium.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
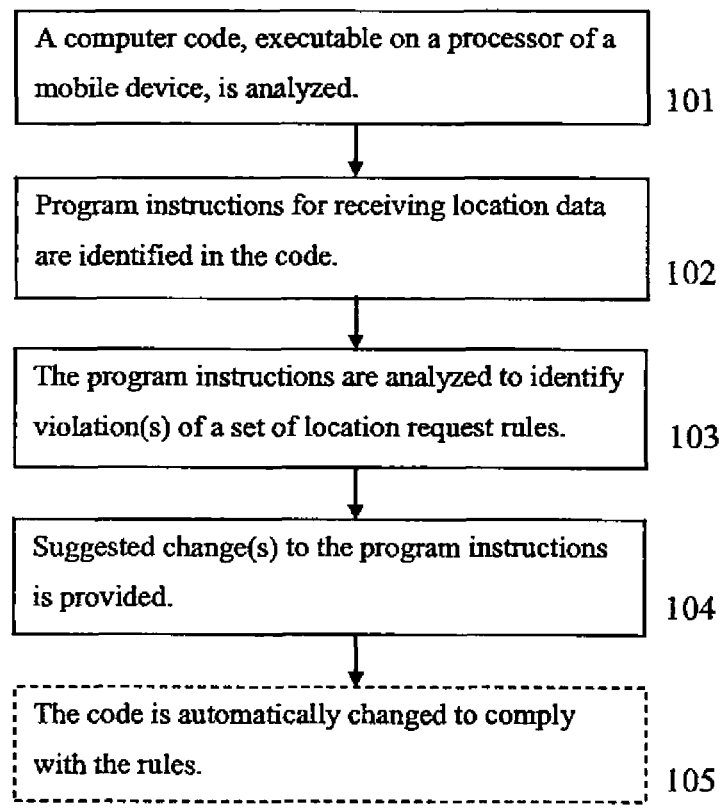
FIG. 1 is a flowchart schematically representing a method for optimizing use of location services in mobile applications, according to some embodiments of the present invention.

The present invention, in some embodiments thereof, relates to improving battery consumption in a mobile device and, more specifically, but not exclusively, to improving battery consumption by optimizing use of location services of the mobile device by applications.

Due to sub-optimal accuracy of location services, frequent movement of the mobile device, the multitude of methods to obtain the location, the difference in these method characteristics, and the desire to conserve battery, getting user location in the proper way becomes complicated task. The developer may request location updates, and control the frequency at which the application receives updates. Requesting location notifications as frequently as possible is not recommended as it may case a battery drain, so a different approach for controlling location requests is needed. Existing analysis tools do not give support of checking errors or weaknesses in using location services.

According to an aspect of some embodiments of the present invention there is provided a method for automatically identifying and optimizing instructions to use location services, such as GPS and/or network location, in the code of mobile applications for mobile devices, such as smartphones and/or tablet computers. The method includes analyzing the code, identifying instructions for location request(s) in the code, comparing the identified instructions to a set of rules of location best practices that minimize battery consumption and providing suggested changes for the code when the instructions do not comply with one or more of the rules. Optionally, the code is automatically changed to comply with the rules.

The method may optionally be applied by a program executed on a client terminal on a pre-compiled code which is edited by a graphical user interface (GUI) of an integrated development environment (IDE), and the suggested changes are presented to the developer on the GUI. The method may optionally be applied to analyze pre-compiled and/or compiled code which is included in a software development kit (SDK) for mobile applications. Optionally, the method may be applied by a program executed on the mobile device to evaluate compiled code of applications installed on the mobile device. Optimizing pre-compiled code allows the programmer to make necessary changes at an early stage of program development.

The set of rules may include, for example, requesting location in proximity to the use of the location data within the application, using network location service instead of GPS location service when possible, using location already requested by the application and/or another application when possible and maximal frequency of location updates received.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
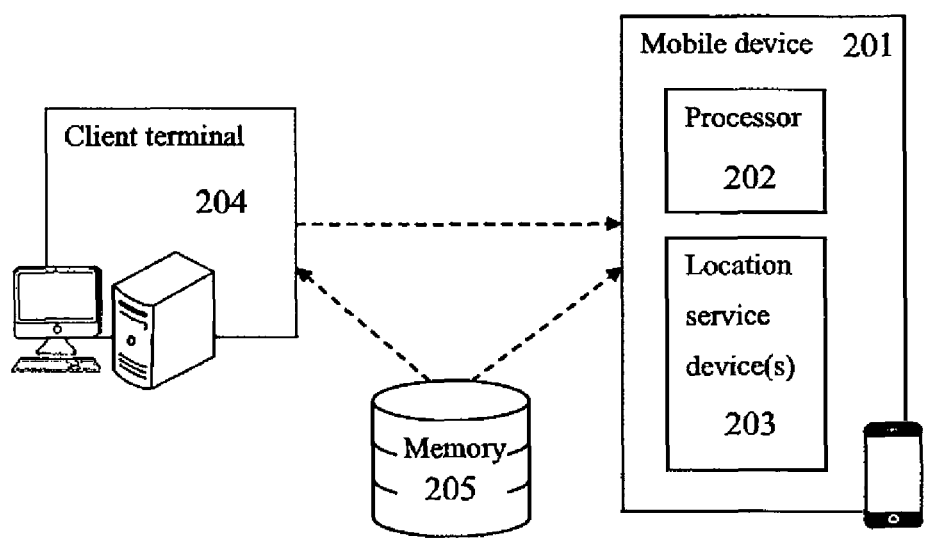
FIG. 2 is a schematic illustration of a system of optimizing use of location services in mobile applications, according to some embodiments of the present invention.

Referring now to the drawings, FIG. 1 is a flowchart schematically representing a method for optimizing use of location services in mobile applications to reduce battery consumption, according to some embodiments of the present invention. Reference is also made to FIG. 2, which is a schematic illustration of a system of optimizing use of location services in mobile applications, according to some embodiments of the present invention.

First, as shown at 101, a computer code, executable on a processor 202 of a mobile device 201, is analyzed.

The code may be in any programming language, for example, HyperText Markup Language (HTML), Java, JavaScript, C++, C#, Swift, objective-c and/or any other language.

Mobile device 201 may include, for example, a smartphone, a tablet, a wearable device such as Google glass, a Smart watch, a laptop computer, and/or any electronic device that has one or more location service device(s) 203. Location service device(s) 203 may include a global positioning system (GPS) device, cellular network positioning, WiFi networks and/or by any other location method and/or combination thereof.

Optionally, this is done by a program executed on a client terminal 204 on a pre-compiled code which is edited by programmer using a graphical user interface (GUI) of an integrated development environment (IDE). The program may be integrated in the IDE, may be an add-on to the IDE or may be executed separately from the IDE. The IDE is executed on client terminal 204, such as a computer, a laptop, a smartphone, a tablet, one or more virtual machines and/or any other processor based machine or appliance. The IDE may be executed on one or more processors, for example, a local application(s), a web service accessible for example using a web browser, a remote service provided by remote one or more servers and/or a web robot (bot) connection. The IDE may include any software and/or hardware program allowing programmers to write, edit and/or test executable code. The GUI may include an input device, for example, keyboard, touchscreen, a digital surface and/or pointing device such as, for example, a mouse and an output device, for example a monitor, a projector and/or a screen. The GUI of the IDE may include an option for a programmer, such as a button, to activate the analyzing process.

Optionally, this is done by a mobile application executed on mobile device 201 on a compiled code of another mobile application currently installed on mobile device 201.

Optionally, the code is included in an SDK for mobile applications. Analyzing the SDK may be done via an IDE or on mobile device 201. This may provide information for a programmer using the SDK regarding the possible battery consumption caused by location services used by the SDK.

Then, as shown at 102, program instructions for receiving location data from a location service device 203 of mobile device 201 are identified in the code.

Location service device 203 may be accessed by a location provider, which is included in the application programming interface (API) of the operation system installed on mobile device 201, such as Google Android, Apple iOS and/or Microsoft Windows.

For example, Android system gives the applications access to the location services by using LocationManager, the central component of the location framework system service, which provides APIs to determine location and bearing of the mobile device (if available). An application may use a LocationManager to query for the list of all location providers for the last known user location, register and unregister for periodic updates of the device's current location from a location provider (specified either by criteria or name) and register/unregister for a given Intent to be fired if the device comes within a given proximity (specified by radius in meters) of a predetermined location (latitude and longitude).

The location providers may include a GPS location provider. This provider determines location using satellites. GPS location provider is most accurate, but works mostly outdoors, quickly consumes battery power and, depending on conditions, this provider may take a while to return a location fix.

The location providers may include a network location provider. This provider determines location based on availability of cell tower and WiFi access points. Results are retrieved by means of a network lookup. Network location works indoors and outdoors, responds faster and uses less battery power than GPS.

The location providers may include a special location provider for receiving locations without actually initiating a location fix. This provider may be used to passively receive location updates when other applications and/or services request them without actually requesting the locations directly. This provider returns locations generated by other providers.

Optionally, the identification is done by finite state machine (FSM) representation of the code. First, the code is represented as FSM, in which the states are the various views of the application and the edges are various events that occur in the application. One view may be represented by more than one state, when after an event the same view stays with a different look. An event may be, for example, a click on a button and/or typing into a data entry field. The FSM has one initial state or view and has one or more final states or views. Pieces of executable code are attached to FSM elements such as buttons. These pieces are invoked when the corresponding event occurs. The representation may contain data dependency flow between the FSM elements, the user interface (UI) elements and the executable code. Parts of the executable code may be represented with intermediate representation (IR) such as abstract syntax tree (AST), control flow graph (CFG), static single assignment form (SSA), program dependence graph (PDG) and/or any other IR. FSM is a frame for IR fragments. For example, code executed in states and/or code invoked on getting event is represented with IR. Using static analysis and/or data dependency on the IR, all the locations in the code were location service API is involved are found.

Then, as shown at 103, the identified program instructions are analyzed according to a set of location request rules, to identify one or more of the program instructions which violate one or more of the location request rules.

Optionally, the set of location request rules is stored in a dataset 205. Dataset 205 may be included in client terminal 204 and/or mobile device 201. Dataset 205 may be any kind of structured data collection that allows access to stored data and may be stored, for example, in a digital data storage unit such as a magnetic drive and/or a solid state drive. Dataset 205 may also include, for example, a content delivery network or content distribution network (CDN) is a large distributed system of servers deployed in multiple data centers across the Internet.

Optionally, the set of location request rules includes rules for requesting location in proximity to the use of the location data within the application. Long windows of listening for location fixes may consume a lot of battery power, therefore moving the start of the listening for updates closer to use of location data decreases buttery power consumption. To discover violation of this rule, for every location service request the distance of the uses of this data from the request is checked, for example by using dynamic profiler, symbolic execution and/or control flow analysis on the representations described above. For example, a special case that may be discovered by such techniques is a case where there is a location service request and there is a control flow path such that the stop listening command is "far" from the use or does not exists. For example, A, B and C are screens and the start listening command is on screen A, the use of location data is on screen B, and the stop listening command is on screen C. When in addition there is an event that takes the flow to another screen D, another stop listening command has to exist in screen D.

Optionally, the set of location request rules includes rules for using network location service instead of GPS location service when possible, because network location service consumes less battery power than GPS. GPS location service should be used only when accuracy of network location service is insufficient. Discovering unnecessary use of GPS may be done by static/dynamic analysis and/or symbolic execution, to check the code that network location provider is tried before calling GPS location provider. Such analysis may be implemented, for example, using text analysis on the AST, control flow analysis on the representation described above and/or any other static/dynamic methods known in the art.

Optionally, the set of location request rules includes rules for using existing location information, when it exists, before sending a request for a new location update. The existing location information may exist in the application itself and/or in another application installed on mobile device 201. Discovering unused existing location information in the application may be done, for example, by checking if there is an existing location parameter in the code.

Optionally, the set of location request rules includes rules for maximal frequency of location updates received. For example, in Android system the developer may control the frequency at which the listener receives updates by adjusting the second and third parameters of requestLocationUpdates( ) function. The second parameter is the minimum time interval between notifications and the third parameter is the minimum change in distance between notifications. Setting both parameters to zero requests location notifications as frequently as possible. The rule(s) may include bounds on these parameters. For example, a bound of the second parameter to be between 3000 and 4000 (meaning update each 3-4 seconds), and/or a bound of the third parameter to get update when the location changes by 10-15 meters. Optionally, the bounds may be adjusted by the developer before performing the analysis. For example, when both parameters are 0 and 0 (which is the very common case), then the values are outside the bounds. Violation of this rule may be discovered by using data flow analysis on the representation described above, symbolic execution and/or any other data static/dynamic methods known in the art, to calculate a superset of the possible value and check whether the superset contains value outside the rule bounds.

Then, as shown at 104, one or more suggested change(s) to the program instructions is provided according to the location request rules. Optionally, the suggested change(s) are presented to the programmer of the code in the GUI of the IDE.

For example, when location service API start (S) is "far" from use of the location data (S'), a change of the code location of S may be suggested. The suggested new code location (L) may be chosen by an algorithm so that: all used values by the elements of S are ready when the control reaches L, all the nodes that use values defined by the elements of S are dominated by L, and L is the closest code location to S' but accurate enough according the required accuracy. Optionally, the algorithm may include interactive mode where the programmer may insert input to find the best code location L. Optionally, the algorithm may include learning approach according to a set of "good" examples.

For another example, when a stop listening command is missing, such stop listening command is suggested to be added in the required code location.

For another example, different second and third parameters of requestLocationUpdates( ) function may be suggested that comply with the rule(s).

Then, optionally, as shown at 104, the code is automatically changed to comply with the rules, according to the suggested change(s).

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant applications for mobile devices will be developed and the scope of the terms application and mobile device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for modifying a computer code of a mobile application to become adapted to an optimized use of location services, comprising:
   analyzing a computer code of a mobile application executable on a processor of a mobile device;
   identifying, in said computer code, at least one code segment which includes program instructions for requesting location data from at least one location service device of said mobile device;

identifying, in said computer code, an other code segment which includes program instructions for using the data acquired from said at least one location service device;

obtaining a pre-defined set of location request rules defining preferred practices for requesting location services to achieve optimized use of said location services;

analyzing said program instructions of said at least one code segment and said other code segment to identify a relation between a location, within said computer code, of said at least one code segment and a location of said other code segment;

determining when said relation violates at least one of said location request rules, wherein said at least one of said location request rules requires a reduction in time window during which said at least one location service device provides location data updates as a result of said request for said location data, before said location data is used; and upon said determination, providing at least one suggested modification to said program instructions, to adapt said computer code to said optimized use, according to said at least one of said location request rules.

2. The method of claim 1, wherein said computer code is edited by a graphical user interface (GUI) of an integrated development environment (IDE) executed on a client terminal.

3. The method of claim 2, wherein said at least one suggested change is presented in said GUI.

4. The method of claim 1, wherein said computer code is included in a software development kit (SDK) for mobile applications.

5. The method of claim 1, wherein said computer code is included in a mobile application currently installed on said mobile device.

6. The method of claim 1, wherein said at least one location service device includes global positioning system (GPS).

7. The method of claim 1, wherein said at least one location service device includes network location service.

8. The method of claim 1, further comprising: automatically changing said computer code according to said at least one suggested change.

9. The method of claim 1, wherein said identifying includes representing said computer code as a finite state machine (FSM).

10. The method of claim 1, wherein said identifying includes representing at least parts of said computer code with intermediate representation (IR).

11. The method of claim 10, wherein said intermediate representation (IR) is one of abstract syntax tree (AST), control flow graph (CFG), static single assignment form (SSA) and program dependence graph (PDG).

12. The method of claim 1, wherein said analyzing of said program instructions includes at least one of dynamic profiler, symbolic execution and control flow analysis.

13. The method of claim 1, wherein said defined relation is a defined proximity, in said computer code, between said location of said code segment responsible for requesting location data and said location of said other code segment responsible for said use of said acquired location data from said at least one location service device, said defined proximity is determined by an algorithm.

14. The method of claim 1, wherein said set of location request rules includes a rule for using network location service instead of GPS location service when possible.

15. The method of claim 1, wherein said set of location request rules includes a rule for using existing location information instead of requesting location updates received from said at least one location service device.

16. The method of claim 1, wherein said set of location request rules includes a rule for maximal frequency of location updates received from said at least one location service device.

17. The method of claim 1, wherein said suggested change includes adding a command to stop requesting location.

18. A computer readable medium comprising computer executable instructions adapted to perform the method of claim 1.

19. A system for modifying a computer code of a mobile application to become adapted to an optimized use of location services, comprising:

a memory storing a pre-defined set of location request rules defining preferred practices for requesting location services;

a code store storing a code of an application; and at least one processor coupled to a graphical user interface (GUI), the memory and the program store for executing the stored code, the code comprising:

code instructions to analyze a computer code of a mobile application executable on a processor of a mobile device;

code instructions to identify in said computer code at least one code segment which includes program instructions for requesting location data from at least one location service device of said mobile device;

code instructions to identify, in said computer code, an other code segment which includes program instructions for using the data acquired from said at least one location service device;

code instructions to analyze said program instructions of said at least one code segment and said other code segment to identify a relation between a location, within said computer code, of said at least one code segment and a location of said other code segment;

code instructions to determine when said relation violates at least one of said location request rules, wherein said at least one of said location request rules requires a reduction in time window during which said at least one location service device provides location data updates as a result of said request for said location data, before said location data is used; and code instructions to provide, upon said determination, at least one suggested modification to said program instructions, to adapt said computer code to said optimized use, according to said at least one of said location request rules.

20. A software program product for modifying a computer code of a mobile application to become adapted to an optimized use of location services, comprising:

a non-transitory computer readable storage medium;

first program instructions for analyzing a computer code of a mobile application, executable on a processor of a mobile device;

second program instructions for identifying in said computer code at least one code segment which includes program instructions for requesting location data from at least one location service device of said mobile device;

third program instructions for identifying, in said computer code, an other code segment which includes program instructions for using the data acquired from said at least one location service device;

fourth program instructions for obtaining a pre-defined set of location request rules defining preferred practices for requesting location services to achieve optimized use of said location services;

fifth program instructions for analyzing said program instructions of said at least one code segment and said other code segment to identify a relation between a location, within said computer code, of said at least one code segment and a location of said other code segment;

sixth program instructions for determining when said relation violates at least one of said location request rules, wherein said at least one of said location request rule requires a reduction in time window during which said at least one location service device provides location data updates as a result of said request for said location data, before said location data is used; and seventh program instructions for providing, upon said determination, at least one suggested modification, to adapt said computer code to said optimized use, according to said at least one of said location request rules;

wherein said first, second, third, fourth, fifth, sixth and seventh program instructions are executed by at least one computerized processor from said non-transitory computer readable storage medium.

* * * * *